(12) United States Patent
Chavda et al.

(10) Patent No.: US 8,775,376 B2
(45) Date of Patent: Jul. 8, 2014

(54) HYBRID DATA BACKUP IN A NETWORKED COMPUTING ENVIRONMENT

(75) Inventors: Kavita Chavda, Roswell, GA (US);
Nagapramod S. Mandagere, San Jose, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/172,930

(22) Filed: Jun. 30, 2011

(65) Prior Publication Data
US 2013/0006943 A1    Jan. 3, 2013

(51) Int. Cl.
*G06F 7/00*      (2006.01)
*G06F 17/00*      (2006.01)

(52) U.S. Cl.
USPC .......................................................... 707/640

(58) Field of Classification Search
None
See application file for complete search history.

(56) References Cited

U.S. PATENT DOCUMENTS

| | | | |
|---|---|---|---|
| 7,539,710 B1 * | 5/2009 | Haustein et al. .................... 1/1 |
| 2009/0235022 A1 | 9/2009 | Bates et al. | |
| 2010/0274982 A1 * | 10/2010 | Mehr et al. .................... 711/162 |
| 2010/0274983 A1 * | 10/2010 | Murphy et al. ............... 711/162 |
| 2010/0293147 A1 * | 11/2010 | Snow et al. .................... 707/640 |
| 2010/0332454 A1 | 12/2010 | Prahlad et al. | |
| 2010/0332456 A1 | 12/2010 | Prahlad et al. | |
| 2010/0333116 A1 | 12/2010 | Prahlad et al. | |
| 2011/0055161 A1 | 3/2011 | Wolfe | |
| 2011/0161291 A1 * | 6/2011 | Taleck et al. ................... 707/622 |
| 2011/0161723 A1 * | 6/2011 | Taleck et al. ................... 714/4.11 |
| 2012/0136960 A1 * | 5/2012 | Liu ................................ 709/217 |
| 2012/0330895 A1 * | 12/2012 | Chavda et al. ................. 707/634 |
| 2013/0006943 A1 * | 1/2013 | Chavda et al. ................. 707/652 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

* cited by examiner

*Primary Examiner* — Robert Beausoliel, Jr.
*Assistant Examiner* — Michael Pham
(74) *Attorney, Agent, or Firm* — William E. Schiesser; Keohane & D Alessandro (57) ABSTRACT

Embodiments of the present invention provide a hybrid (e.g., local and remote) approach for data backup in a networked computing environment (e.g., a cloud computing environment). In a typical embodiment, a set of storage configuration parameters corresponding to a set of data to be backed up is received and stored in a computer data structure. The set of storage configuration parameters can comprise at least one of the following: a recovery time objective (RTO), a recovery point objective (RPO), and a desired type of protection for the set of data. Regardless, the set of data is compared to previously stored data to identify at least one of the following: portions of the set of data that have commonality with the previously stored data; and portions of the set of data that are unique to the set of data (i.e., not in common with any of the previously stored data). The above-described process is referred to herein as "de-duplication". A storage solution is then determined based on the set of storage configuration parameters. In general, the storage solution identifies at least one local storage resource and at least one remote storage resource (e.g., a cloud storage resource) for backing up the portions of the set of data that are unique to the set of data. Once the storage solution has been determined, the unique portions of the set of data will be stored in accordance therewith.

25 Claims, 7 Drawing Sheets

HYBRID DATA BACKUP IN A NETWORKED COMPUTING ENVIRONMENT

TECHNICAL FIELD

In general, the present invention relates to data backup. Specifically, the present invention relates to hybrid data backup (e.g., local and remote data backup) in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges can exist when attempting to leverage technology such as cloud computing technology when providing data storage solutions. Factors involved with determining specific data storage solutions can even be in conflict with one another. For example, added redundancy and security provided by remote backup solutions may require more data recovery time and expense than local backup solutions.

SUMMARY

In general, embodiments of the present invention provide a hybrid (e.g., local and remote) approach for data backup in a networked computing environment (e.g., a cloud computing environment). In a typical embodiment, a set of storage configuration parameters corresponding to a set of data to be backed up is received and stored in a computer data structure. The set of storage configuration parameters can comprise at least one of the following: a recovery time objective (RTO), a recovery point objective (RPO), and a desired type of protection for the set of data. Regardless, the set of data is compared to previously stored data to identify at least the following: portions of the set of data that have commonality with the previously stored data; and portions of the set of data that are unique to the set of data (i.e., not in common with any of the previously stored data). The above-described process is referred to herein as "de-duplication". A storage solution is then determined based on the set of storage configuration parameters. In general, the storage solution identifies at least one local storage resource and at least one remote storage resource (e.g., a cloud storage resource) for backing up the portions of the set of data that are unique to the set of data. Once the storage solution has been determined, the unique portions of the set of data will be stored in accordance therewith.

A first aspect of the present invention provides a computer-implemented method for data backup in a networked computing environment, comprising: receiving and storing in a computer data structure a set of storage configuration parameters corresponding to a set of data to be backed up, the set of storage configuration parameters comprising at least one of the following, a recovery time objective (RTO), a recovery point objective (RPO), and a desired type of protection for the set of data; comparing the set of data to previously stored data to identify portions of the set of data that have commonality with the previously stored data, and portions of the set of data that are unique to the set of data; determining a storage solution for storing the set of data based on the set of storage configuration parameters, the storage solution identifying at least one local storage resource and at least one remote storage resource for backing up the portions of the set of data that are unique to the set of data; and storing the portions of the set of data that are unique to the set of data in accordance with the storage solution.

A second aspect of the present invention provides a system for data backup in a networked computing environment, comprising: a bus; a processor coupled to the bus; and a memory medium coupled to the bus, the memory medium comprising instructions to: receive and store in a computer data structure a set of storage configuration parameters corresponding to a set of data to be backed up in computer memory, the set of storage configuration parameters comprising at least one of the following: a recovery time objective (RTO), a recovery point objective (RPO), and a desired type of protection for the set of data; compare the set of data to previously stored data to identify portions of the set of data that have commonality with the previously stored data, and portions of the set of data that are unique to the set of data; determine a storage solution for storing the set of data based on the set of storage configuration parameters, the storage solution identifying at least one local storage resource and at least one remote storage resource for backing up the portions of the set of data that are unique to the set of data; and store the portions of the set of data that are unique to the set of data in accordance with the storage solution.

A third aspect of the present invention provides a computer program product for data backup in a networked computing environment, the computer program product comprising a computer readable storage media, and program instructions stored on the computer readable storage media, to: receive and store in a computer data structure a set of storage configuration parameters corresponding to a set of data to be backed up in computer memory, the set of storage configuration parameters comprising at least one of the following: a recovery time objective (RTO), a recovery point objective (RPO), and a desired type of protection for the set of data; compare the set of data to previously stored data to identify portions of the set of data that have commonality with the previously stored data, and portions of the set of data that are unique to the set of data; determine a storage solution for storing the set of data based on the set of storage configuration parameters, the storage solution identifying at least one local storage resource and at least one remote storage resource for backing up the portions of the set of data that are unique to the set of data; and store the portions of the set of data that are unique to the set of data in accordance with the storage solution.

A fourth aspect of the present invention provides a method for deploying a system for data backup in a networked computing environment: providing a computer infrastructure being operable to: receive and store in a computer data structure a set of storage configuration parameters corresponding to a set of data to be backed up in computer memory, the set of storage configuration parameters comprising at least one of the following, a recovery time objective (RTO), a recovery point objective (RPO), and a desired type of protection for the set of data; compare the set of data to previously stored data to identify portions of the set of data that have commonality with the previously stored data, and portions of the set of data that are unique to the set of data; determine a storage solution for storing the set of data based on the set of storage configuration parameters, the storage solution identifying at least one local storage resource and at least one remote storage resource for backing up the portions of the set of data that are unique to the set of data; and store the portions of the set of data that are unique to the set of data in accordance with the storage solution.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide a hybrid (e.g., local and remote) approach for data backup in a networked computing environment (e.g., a cloud computing environment). In a typical embodiment, a set of storage configuration parameters corresponding to a set of data to be backed up are received and stored in a computer data structure. The set of storage configuration parameters can comprise at least one of the following, a recovery time objective (RTO), a recovery point objective (RPO), and a desired type of protection for the set of data. Regardless, the set of data is compared to previously stored data to identify at least one of the following: portions of the set of data that have commonality with the previously stored data; and portions of the set of data that are unique to the set of data (i.e., not in common with any of the previously stored data). The above-described process is referred to herein as "de-duplication". A storage solution is then determined based on the set of storage configuration parameters. In general, the storage solution identifies at least one local storage resource and at least one remote storage resource (e.g., a cloud storage resource) for backing up the portions of the set of data that are unique to the set of data. Once the storage solution has been determined, the unique portions of the set of data will be stored in accordance therewith.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Figure 1:
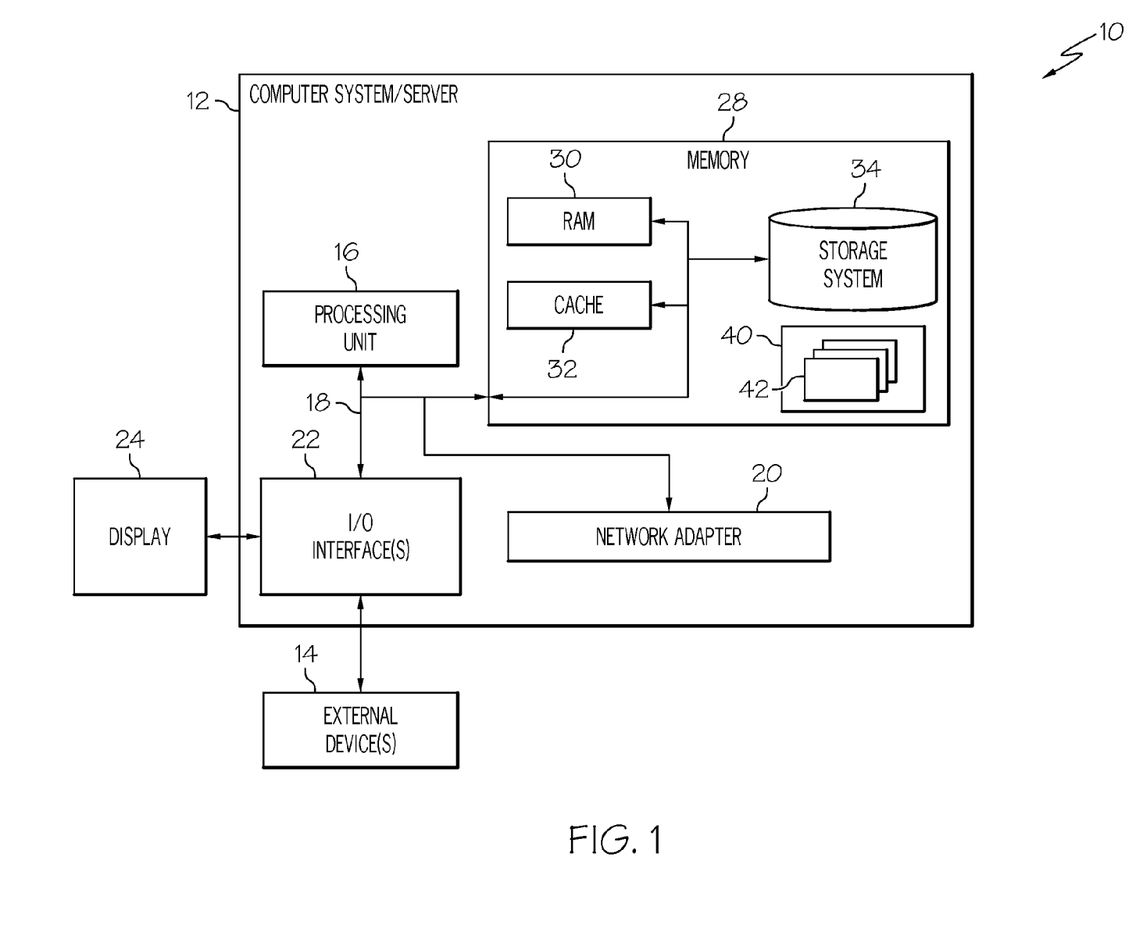
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
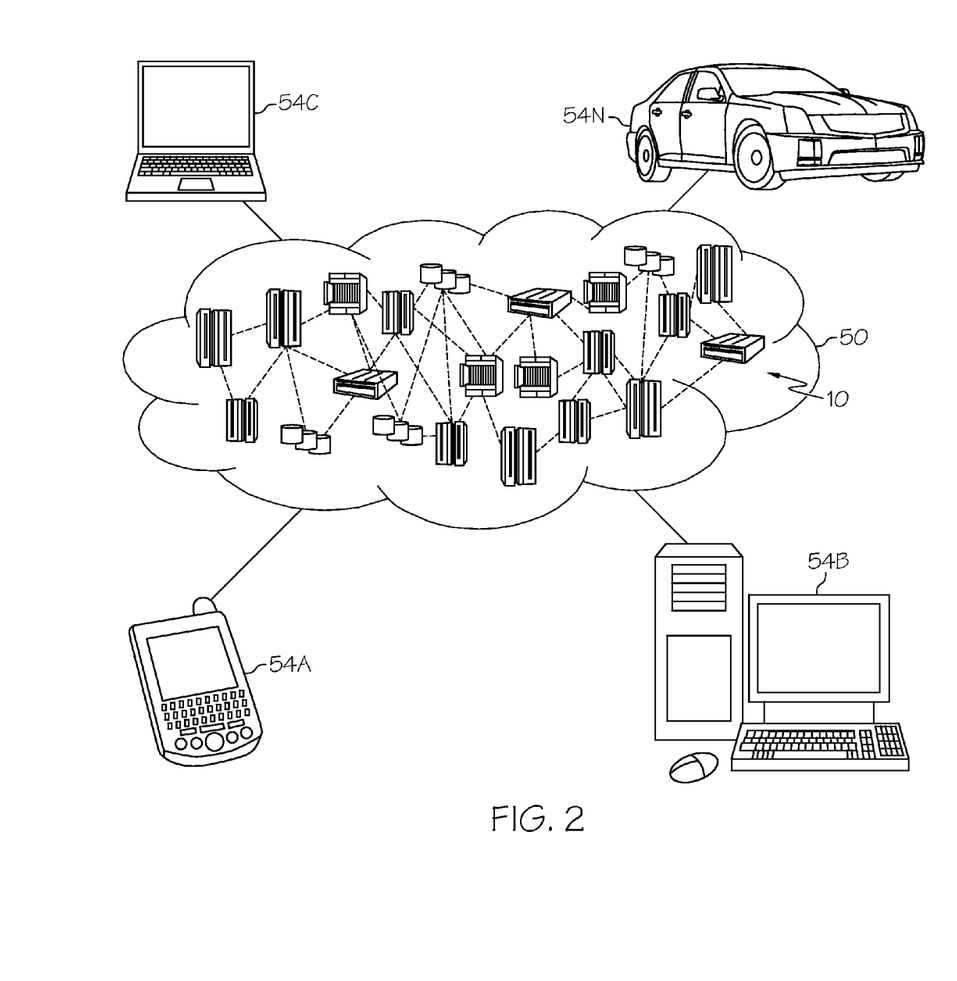
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
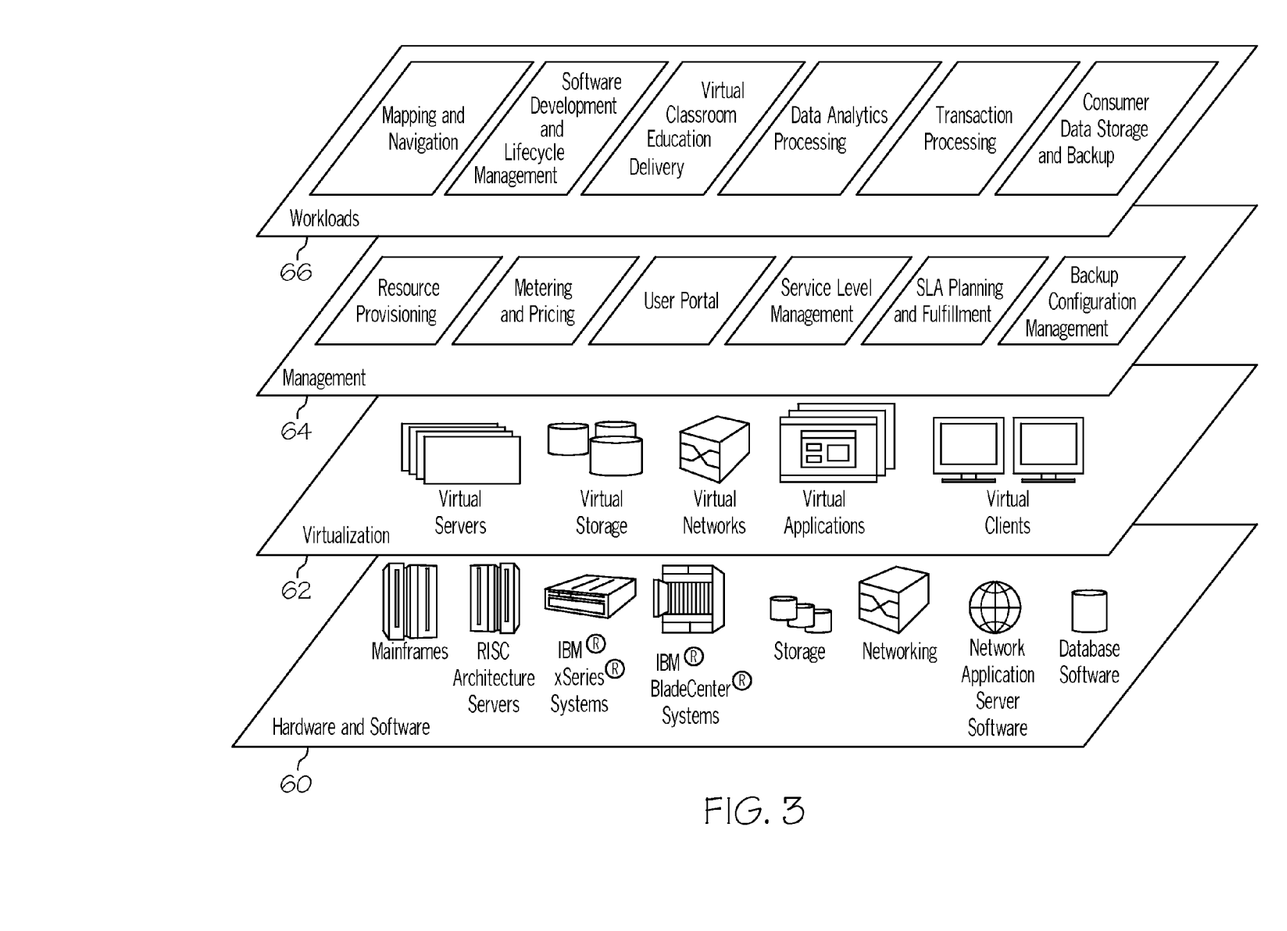
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is (hybrid) data backup configuration management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the data backup configuration management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
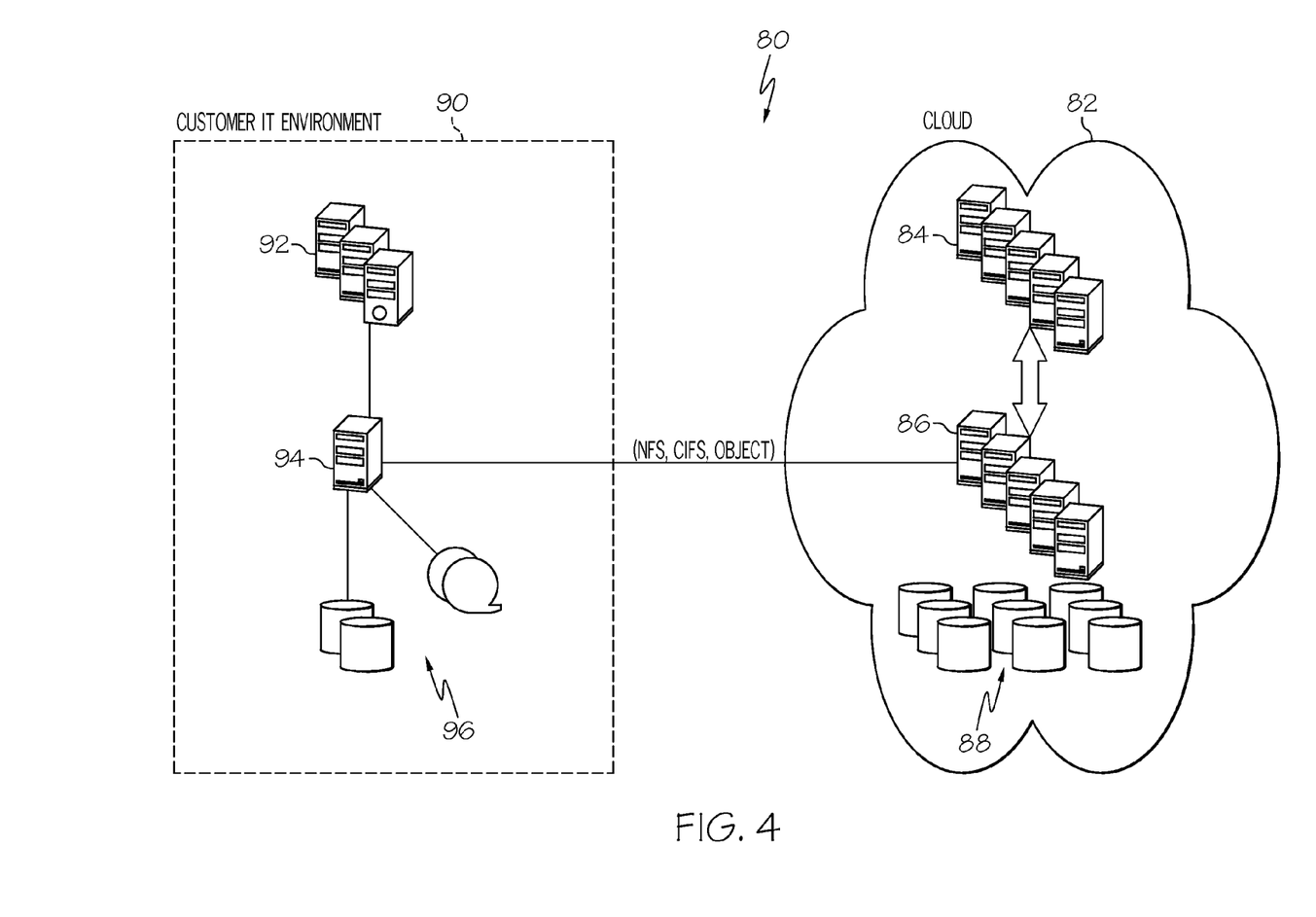
FIG. 4 depicts an illustrative cloud data backup environment according to an embodiment of the present invention.

Referring now to FIG. 4, a cloud data backup system (system 80) according to an embodiment of the present invention is shown. As depicted, system 80 comprises a cloud computing environment (cloud 82) that itself comprises a compute cloud 84 for processing workloads and the like, and a storage cloud 86 for storing data. Along these lines, storage cloud 86 can leverage storage resources such as storage devices 88 and the like. Further shown is customer information technology (IT) environment 90 that comprises application servers/desktop computers 92, backup appliance(s) 94 and local storage resources 96 (e.g., storage pools, tapes, etc.) Communication between environment 90 and cloud 82 can occur via a network file system (NFS), a common internet file system (CIFS), or object-based approaches. Among other things, system 80 provides: site-level disaster recover (DR) for a lower expense than the customer would incur to install a secondary site; flexibility in on-demand use of storage resources; co-location of storage and compute allowing the backup data to be used for new value-add services such as data consistency verification, data mining/business intelligence applications; enhanced security with data encryption on-wire and on-rest; and intelligent use of network bandwidth using techniques such as de-duplication, network acceleration, disconnected operation support, etc.

In general, system 80 supports at least two types of data backup: standard/local cloud backup (also referred to in the art as vanilla cloud backup); and hybrid cloud backup. Standard cloud backup refers to an approach where a software agent is installed on individual servers and desktops 92. The data is backed up into a storage-as-a-service environment. The software agent maintains the namespace and versioning. The backup type is typically incremental indefinitely, such that the changed files are copied during each backup. The agent maintains the bookkeeping details both locally as well as in cloud 82. This approach has a higher recovery point objective (RPO) especially for a complete data restore for a system on which no data has been previously installed.

In the hybrid cloud backup approach, an appliance is deployed on the customer site. The appliance treats the cloud 82 as another "backup pool." Agents may be still installed on the individual servers, but are extremely light-weight. The bookkeeping tasks are managed by the appliance (similar to the local backup scenario). One advantage of this approach is the ability to rapidly restore using a local copy of data.

Either of these two approaches can be optimized to minimize the bandwidth usage using de-duplication and compression techniques. Under the embodiments of the present invention, a hybrid cloud backup approach is provided. In general, a typical deployment has the following design features:

A finite local storage pool.
Data available in cloud 80 is typically in a de-duplicated fashion. Along these lines, there are at least two design options: de-duplicated portions of a file are typically maintained in a single pool; and/or the de-duplicated portions can be distributed across multiple pools such that one portion of the file is in a local pool, while the other portion is in the cloud 82.
Incremental indefinite backups are made such that a full backup needs to constructed if value-add services such as compliance, testing, etc., are to be used; and/or
Limited bandwidth between the local data-center and the cloud.

One challenge is data restore from cloud 82. Along these lines, the embodiments of the present invention (as will be further discussed below) provide: application-aware de-duplication portion placement between local storage and cloud storage resources for lower recovery time objectives (RTO); streaming reconstruction of data from the cloud storage resources 88 to allow application to restart without all the available data; and/or an estimation algorithm to provide a time-value to restore data from a given snapshot.

Figure 5:
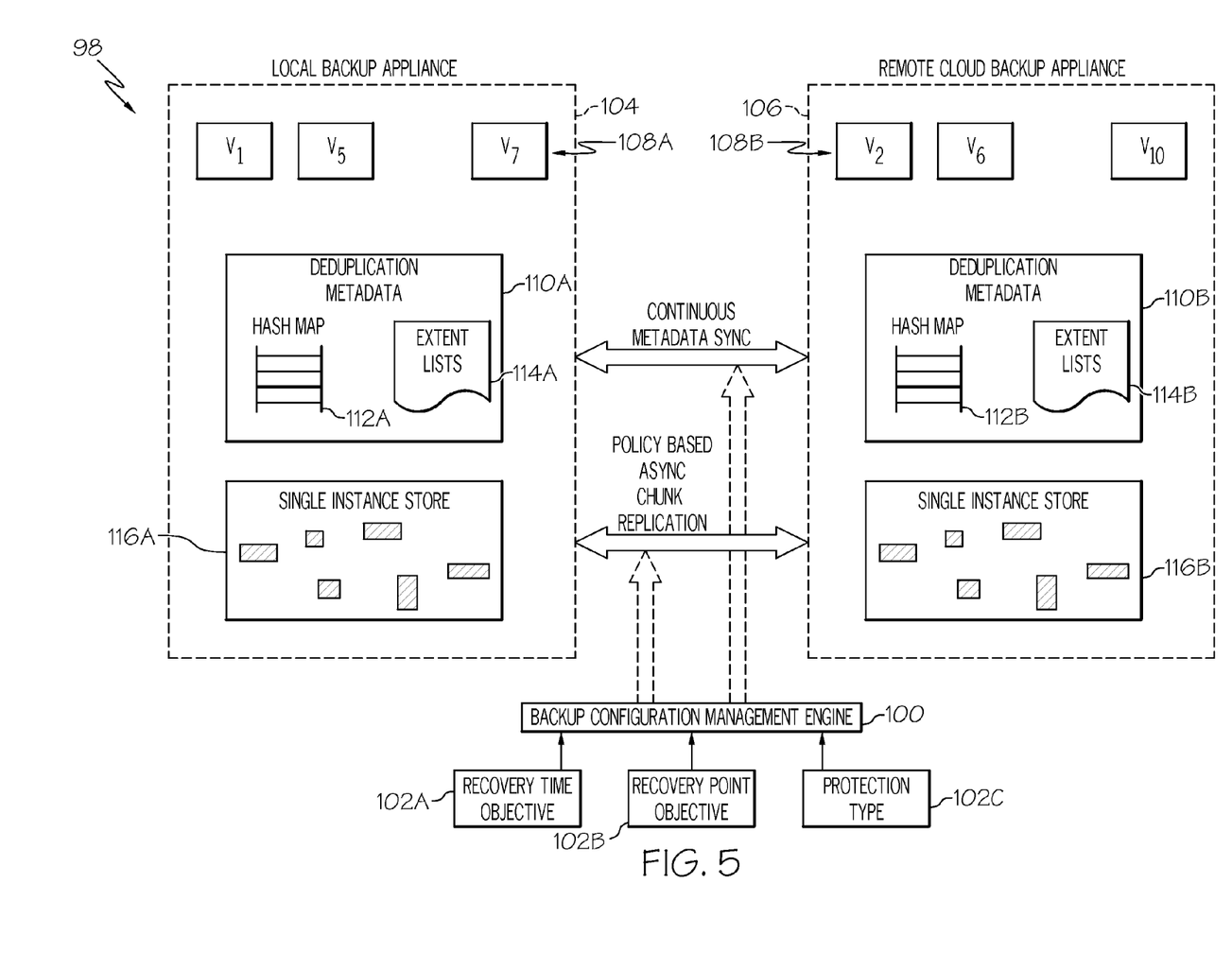
FIG. 5 depicts a system diagram according to an embodiment of the present invention.
Figure 6:
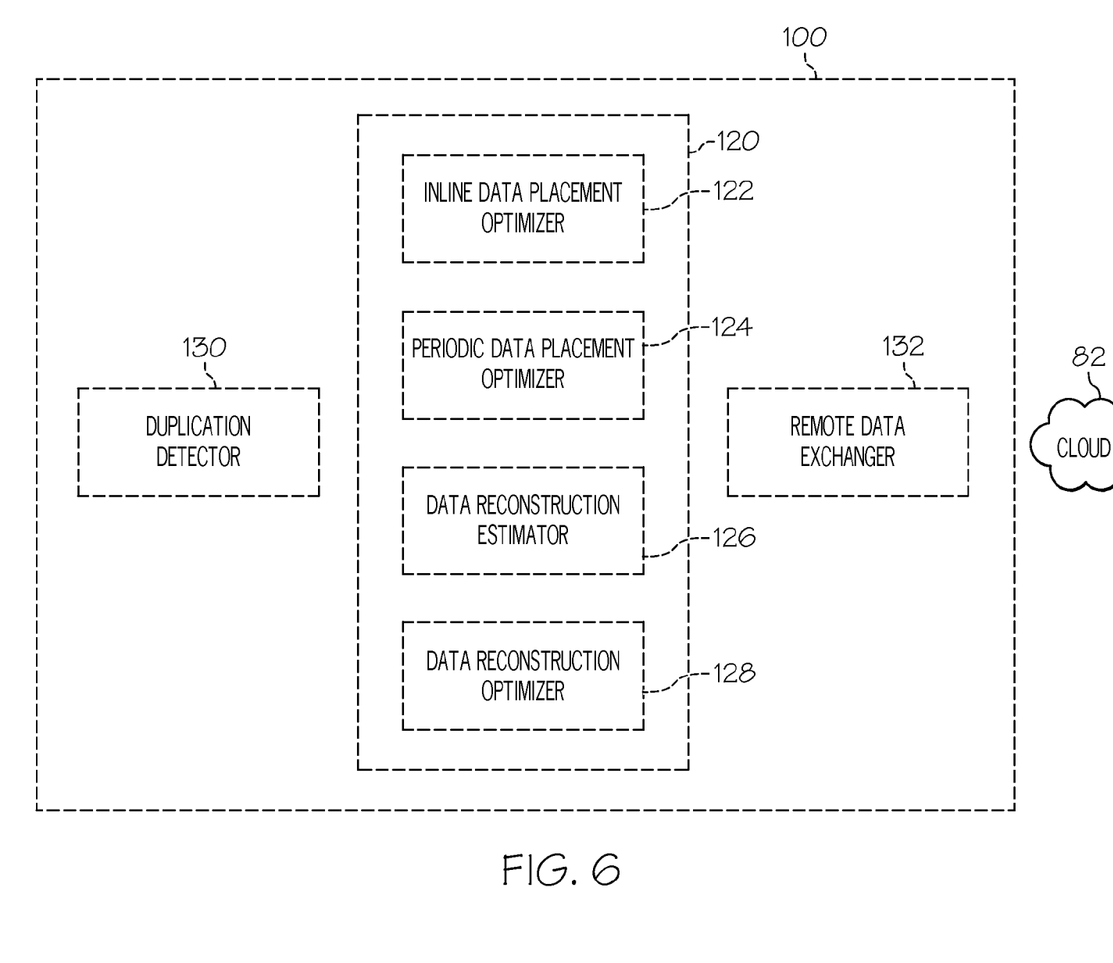
FIG. 6 depicts a block diagram of the data backup configuration management engine of FIG. 5 according to an embodiment of the present invention.
Figure 7:
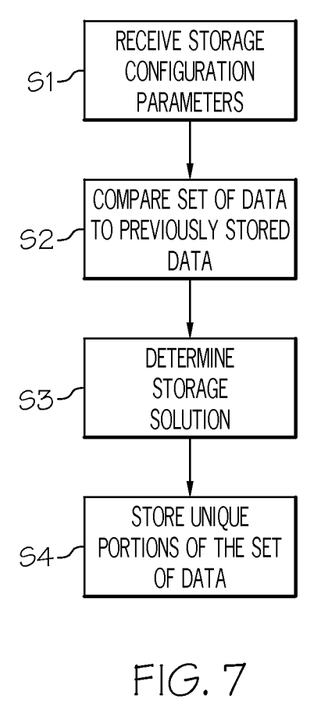
FIG. 7 depicts a method flow diagram according to an embodiment of the present invention.

As will be further described in conjunction with FIGS. 5-7, the embodiments of the present invention can have multiple phases/functions. It is understood that the phases/functions shown below are organized for convenience purposes only. As such, the phases/functions shown below can be expanded into additional phases/functions and/or consolidated into fewer phases/functions.

1. List of files to backup: At the time of backup, the agent running on the servers/desktop gets a list of modified files since the last backup. The files are then sent to the backup appliance. During the backup window, some subset of the files may be modified, which is not an issue for unstructured data. In the case of application data, a stronger form of consistency is to take a snapshot before backup. The ability to take either a consistent snapshot or a crash consistent snapshot is a part of the agent code.
2. Recovery point per file list per backup window: The backup appliance receives a list of files to be backed up from each authenticated agent. It defines a globally unique namespace for the backup objects. The bookkeeping process returns a recovery point token corresponding to each backup request from each agent. The backup appliance is configured by policy to determine the number of backup versions to be kept and for how long. In the case of a circular queue, the new backup deletes the oldest one.
3. Backed file→de-duplicated portions→pool placement: The backup appliance mounts the cloud storage as another storage pool (typically using NFS mount). The files are stored in de-duplicated fashion. Each file maps to one or more de-duplicated portions. The unique unseen portions are persisted across the local and cloud pools. The embodiments herein use an intelligent portion placement algorithm taking into account application data-classes, reference count, file membership, priority, RPO goals etc.
4. Promotions and demotions across pools: Typically the local storage is much smaller than the cloud capacity usage (e.g., of the order of 1:100 to 1:1000). As new de-duplicated portions are created, the existing portions belonging to a particular application or server can be moved out of local storage or vice-versa.
5. Estimating reconstruction time: At the time of recovery, the administrator expects a list of recovery points with an estimate for the reconstruction time. The time estimation is dependent on the percentage of portions that are local, the availability of portions with large reference counts, and the dependency of the application on the particular data class. The embodiments use an intelligent approach to estimate the recovery times and optimize the implementation.
6. Streaming reconstruction of portions: Instead of waiting for the entire data-set to be available before application restart, the embodiments use an on-demand streaming approach.

Referring now to FIG. 5, a system 98 for providing hybrid data backup in a networked computing environment according to an embodiment of the present invention is shown. As depicted, system 98 comprises backup configuration management engine (engine 100), which may be implemented as program 40 of FIG. 1 and supports the backup configuration management function in management layer 64 of FIG. 3. As further shown, system 98 comprises a local backup appliance (LBA 104) and a remote cloud backup appliance (RCBA 106). As further shown, LBA 104 and RCBA 106 comprise complimentary components; namely, data versions 108A-B, de-duplication metadata 110A-B such as hash maps 112A-B and extent lists 114A-B, and single instance data stores 116A-B.

In the illustrative embodiment shown in FIG. 5, multiple versions 108A-B of a set of data set stored in a hybrid fashion (e.g., locally and remotely). Engine 100 includes various modules (e.g., modules 42 of FIG. 1) to prevent multiple portions of the same set of data from being stored multiple times and/or in multiple places. This process is known as de-duplication. As such, hash maps 112A-B and extent lists 114A-b are provided on LBA 104 and RCBA 106. Hash maps 112A-B identify previously stored data while extent lists indicate their storage locations (in single instance stores 116A-B) so that when a new set of data is received, portions of the new set of data that have commonality with the previously stored data are not stored again. That is, engine 100 (among other things) permits the storage of only those portions of data that are unique to a newly received set of data (e.g., unique portions of data). This not only saves storage space, but also increases the time with which the set of data and retrieved from storage and re-compiled.

To this extent, engine 100 will determine a storage solution for storing unique portions of a set of data among LBA 104 and RCBA 106 (or any combination thereof) in such a way that the input storage configuration parameters are met. Along these lines, a set of storage configuration parameters 102A-C corresponding to a set of data to be backed up will be received by engine 100 and stored in a data structure or the like (e.g., memory 28 of node 10 of FIG. 1). The set of storage configuration parameters typically comprises at least one of the following: a recovery time objective (RTO) 102A, a recovery point objective (RPO) 102B, and/or and a desired type of protection 102C for the set of data. In general, RTO 102A comprises a desired time for processing the request to retrieve the set of data. RPO 102B comprises a restore point in time for which the request to retrieve the set of data is received. Desired protection type 102C expresses a desire to protect the set of data against at least one of the following types of failures of the backing up of the set of data: a logical failure, a subsystem failure, a system failure, or a site failure.

Regardless, engine 100 will compare the set of data to previously stored data to identify portions of the set of data that have a commonality with the previously stored data and portions of the set of data that are unique to the set of data (i.e., unique portions of data). As indicated above, hash maps 112A-B are provided. When the previously received data was stored, a hash algorithm was applied a corresponding entry in hash maps 112A-B was created. As such, engine 100 will analyze hash maps 112A-B to identify portions thereof the newly received set of data that have commonality the previously stored data. Any other portions of the newly received set of data (i.e., portions that do not have commonality) are considered unique portions of data. Based on this comparison operation and set of storage configuration parameters 102A-C, engine 100 will then determine a storage solution for storing the unique portions of the set of data. In a typical embodiment, the storage solution identifies at least one local storage resource 116A and at least one remote storage resource 116B for backing up the unique portions of data. Thereafter, engine 100 will store the unique portions in accordance with the storage solution.

Thereafter, when the consumer desires to retrieve the set of data, engine 100 will receive a corresponding request, analyze extent lists 114A-B to retrieve the portions of data that have commonality with the previously stored data, and the portions of the set of data that are unique to the set of data from their respective locations. Along these lines, extent lists 114A-B can be regarded as a type of road map or recipe for recreating the set of data from their individual portions by providing respective storage locations of the portions of data as well as an order in which the various portions of the set of data should be re-assembled. Then, engine 100 will (re-)compose the set of data by combining the portions of the set of data that have commonality with the previously stored data and the portions of the set of data that are unique to the set of data.

Referring to FIG. 6, a more detailed diagram of engine 100 is shown. As depicted, engine 100 includes the following modules (also represented by modules 42 of program/utility of FIG. 1): duplication detector 130 that performs the comparison operation (e.g., analyses hash maps, etc.) as discussed above, optimization system 120, and remote data exchanger 132 that allows data to be sent to and received from cloud 82. In general, optimization system 120 has the following modules/components and corresponding functions:

Inline data placement optimizer 122 receives: input/incoming sets of data to portion mappings, portion metadata and existing portion placement information, and RTO/RPO parameters for incoming sets of data. For each portion, inline data placement optimizer 122 will perform the following steps:
1. Determine if the portion has other references (e.g., shared with other files or duplicated).
2. Determine if the portion is a duplicate (preexisting). If so, go to step 4, otherwise go to step 3.
3. Determine storage location/placement based on the RTO/RPO requirements of the incoming file.
4. Reexamine the original matching portion to check if RTO/RPO parameters of the new incoming set of data are met. If not, the portion is relocated such that combined RTO/RPO requirements of all files that share this portion are met.

Based on these steps, inline data placement optimizer 122 generates portion placement directives. Such directives can have the following illustrative format:
((Portion A, (Loc1, Loc2)), ((Portion B, (Loc2))
Where Portion A is stored in two locations, Loc1 and Loc2 and Portion B is stored in Loc2.

Periodic data placement optimizer 124 receives: existing portion placement information, RTO/RPO parameters for all sets of data in the system, hardware/resource/failure characteristics, and data set versioning characteristics. In general, periodic data placement optimizer 124 examines and executes corrective actions on encountering one or more of the following conditions:
1. File aging that results in violations of RTO/RPO parameters;
2. System resource changes; and
3. Change in failure characteristics.

Based on these functions, periodic data placement optimizer 124 generates portion redistribution directives. Such directives can have the following illustrative format:
((Portion A, (Loc1, Loc2)), ((Portion B, (Loc2))
Where Portion A is stored in two locations, Loc1 and Loc2 and Portion B is stored in Loc2.

Data reconstruction estimator 126 and data reconstruction optimizer 128 typically work in conjunction with one another. In general, data reconstruction estimator 126 estimates a time for reconstructing data from storage. Data reconstruction optimizer 128, among other things, attempts to determine a reconstruction sequence and timing so that parameters such as RTO are not violated. Along these lines, data reconstruction optimizer 128 first determined portion versions by performing one or more of the following functions:

1) Determine required portion identifiers for reconstructing the set of data using de-duplication metadata;
2) If a required portion is at multiple locations, portion selection is done based on performance characteristics of different nodes; and
3) Collective portion retrieval optimization.

In addition, data reconstruction optimizer 128 will determine the ordering of portions for a restoration/(re)complication of the set of data by performing one or more of the following functions:

1) Using application knowledge to determine a best restoration ordering of portions. When an application starts/loads, the application starts by looking at its persistent data (on disk) in certain order. The application does not necessarily looks at every piece of data at startup, rather, the application may need only a subset of its overall data and in certain order it tries access them. If the reconstruction process ensures that data is retrieved from the remote storage in this order, then applications using this data can start much faster instead of waiting for all its dataset to be restored. The data subset/order is characteristic of the application in question. For instance, an email server and a database access data in totally different ways; and
2) While restoring multiple files, performing collective optimization to improve (e.g., accelerate) overall restore times. When multiple files have to be restored, existing methods restore/copy back files one by one or in parallel. The embodiments of the present invention, de-duplicates between these files too, hence reducing the amount of data transferred over the network, there by speeding up the process, Referring now to FIG. 7, a method flow diagram according to an embodiment of the present invention is shown. In step S1, a set of storage configuration parameters corresponding to a set of data to be backed up are received and stored in a computer data structure. As discussed above, the set of storage configuration parameters typically comprise at least one of the following, a recovery time objective (RTO), a recovery point objective (RPO), and a desired type of protection for the set of data. In step S2, the set of data is compared to previously stored data to identify portions of the set of data that have commonality with the previously stored data and portions of the set of data that are unique to the set of data. In step S3, a storage solution is determined for the set of data based on the set of storage configuration parameters. The storage solution typically identifies at least one local storage resource and at least one remote storage resource for backing up the portions of the set of data that are unique to the set of data. In step S4, the portions of the set of data that are unique to the set of data are stored in accordance with the storage solution. The method can be further enhanced with one or more of the following steps:

(1) For unique data, determining a storage solution based on the set of storage configuration parameters, RTO and RPO, the storage solution identifying at least one local or remote storage resource for backing up the portions of the set of data that are unique to the set of data; and storing the portions of the set of data that are unique to the set of data in accordance with the storage solution.
(2) For common data, determining a storage solution based on the set of storage configuration parameters, RTO and RPO of all files/data that refer to this common data, and evaluating if current allocation satisfies these requirements, else relocating data accordingly.

While shown and described herein as a hybrid data backup configuration management solution, it is understood that the invention further provides various alternative embodiments. For example, in one embodiment, the invention provides a computer-readable/useable medium that includes computer program code to enable a computer infrastructure to provide hybrid data backup configuration management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide hybrid data backup configuration management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for hybrid data backup configuration management. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for data backup in a networked computing environment, comprising:
   receiving and storing in a computer data structure a set of storage configuration parameters corresponding to a set of data to be backed up, the set of storage configuration parameters comprising at least one of the following: a recovery time objective (RTO), a recovery point objective (RPO), and a desired type of protection for the set of data;
   comparing the set of data to previously stored data to identify portions of the set of data that have commonality with the previously stored data, and portions of the set of data that are unique to the set of data;
   making a determination as to whether the storage configuration parameters corresponding to the set of data are met by the previously stored data to which the set of data has commonality;
   if the determination is that the storage configuration parameters are not met by the previously stored data to which the set of data has commonality, relocating the previously stored data to which the set of data has commonality to a resource where the storage configuration parameters are met;
   determining a storage solution for storing the set of data based on the set of storage configuration parameters, the storage solution identifying at least one local storage resource and at least one remote storage resource for backing up the portions of the set of data that are unique to the set of data; and
   storing the portions of the set of data that are unique to the set of data in accordance with the storage solution.

2. The computer-implemented method of claim 1, the networked computing environment comprising a cloud computing environment.

3. The computer-implemented method of claim 1, further comprising updating, responsive to the storing, a hash map and an extent list to reflect a location of portions of the set of data that are unique to the set of data.

4. The computer-implemented method of claim 3, the comparing comprising analyzing the hash map to identify the portions of the set of data that have commonality with the previously stored data.

5. The computer-implemented method of claim 3, further comprising:
   receiving a request to retrieve the set of data;
   analyzing the extent list to retrieve the portions of data that have commonality with the previously stored data, and the portions of the set of data that are unique to the set of data from their respective locations; and
   composing the set of data by combining the portions of the set of data that have commonality with the previously stored data and the portions of the set of data that are unique to the set of data.

6. The computer-implemented method of claim 5, the RTO comprising a desired time for processing the request to retrieve the set of data.

7. The computer-implemented method of claim 5, the RPO comprising a restore point in time for which the request to retrieve the set of data is received.

8. The computer-implemented method of claim 1, the desired protection type being configured to protect against at least one of the following types of failures of the backing up of the set of data: a logical failure, a subsystem failure, a system failure, or a site failure.

9. A system for data backup in a networked computing environment, comprising:
   a bus;
   a processor coupled to the bus; and
   a memory medium coupled to the bus, the memory medium comprising instructions to:
      receive and store in a computer data structure a set of storage configuration parameters corresponding to a set of data to be backed up in computer memory, the set of storage configuration parameters comprising at least one of the following: a recovery time objective (RTO), a recovery point objective (RPO), and a desired type of protection for the set of data;
      compare the set of data to previously stored data to identify portions of the set of data that have commonality with the previously stored data, and portions of the set of data that are unique to the set of data;
      make a determination as to whether the storage configuration parameters corresponding to the set of data are met by the previously stored data to which the set of data has commonality;
      if the determination is that the storage configuration parameters are not met by the previously stored data to which the set of data has commonality, relocate the previously stored data to which the set of data has commonality to a resource where the storage configuration parameters are met;
      determine a storage solution for storing the set of data based on the set of storage configuration parameters, the storage solution identifying at least one local storage resource and at least one remote storage resource for backing up the portions of the set of data that are unique to the set of data; and
      store the portions of the set of data that are unique to the set of data in accordance with the storage solution.

10. The system of claim 9, the networked computing environment comprising a cloud computing environment.

11. The system of claim 9, the memory medium further comprising instructions to update, responsive to the storage of the portions of the set of data that are unique to the set of data, a hash map and an extent list to reflect a location of portions of the set of data that are unique to the set of data.

12. The system of claim 11, the memory medium further comprising instructions to analyze the hash map to identify the portions of the set of data that have commonality with the previously stored data.

13. The system of claim 11, the memory medium further comprising instructions to:
- receive a request to retrieve the set of data;
- analyze the extent list to retrieve the portions of data that have commonality with the previously stored data, and the portions of the set of data that are unique to the set of data from their respective locations; and
- compose the set of data by combining the portions of the set of data that have commonality with the previously stored data and the portions of the set of data that are unique to the set of data.

14. The system of claim 13, the RTO comprising a desired time for processing the request to retrieve the set of data.

15. The system of claim 13, the RPO comprising a restore point in time for which the request to retrieve the set of data is received.

16. The system of claim 9, the desired protection type being configured to protect against at least one of the following types of failures of the backing up of the set of data: a logical failure, a subsystem failure, a system failure, or a site failure.

17. A computer program product for data backup in a networked computing environment, the computer program product comprising a non-transitory computer readable storage medium, and program instructions stored on the non-transitory computer readable storage medium, to:
- receive and store in a computer data structure a set of storage configuration parameters corresponding to a set of data to be backed up in computer memory, the set of storage configuration parameters comprising at least one of the following: a recovery time objective (RTO), a recovery point objective (RPO), and a desired type of protection for the set of data;
- compare the set of data to previously stored data to identify portions of the set of data that have commonality with the previously stored data, and portions of the set of data that are unique to the set of data;
- make a determination as to whether the storage configuration parameters corresponding to the set of data are met by the previously stored data to which the set of data has commonality;
- if the determination is that the storage configuration parameters are not met by the previously stored data to which the set of data has commonality, relocate the previously stored data to which the set of data has commonality to a resource where the storage configuration parameters are met;
- determine a storage solution for storing the set of data based on the set of storage configuration parameters, the storage solution identifying at least one local storage resource and at least one remote storage resource for backing up the portions of the set of data that are unique to the set of data; and
- store the portions of the set of data that are unique to the set of data in accordance with the storage solution.

18. The computer program product of claim 17, the networked computing environment comprising a cloud computing environment.

19. The computer program product of claim 17, the non-transitory computer readable storage medium further comprising instructions to update, responsive to the storage of the portions of the set of data that are unique to the set of data, a hash map and an extent list to reflect a location of portions of the set of data that are unique to the set of data.

20. The computer program product of claim 19, the non-transitory computer readable storage medium further comprising instructions to analyze the hash map to identify the portions of the set of data that have commonality with the previously stored data.

21. The computer program product of claim 19, the non-transitory computer readable storage medium further comprising instructions to:
- receive a request to retrieve the set of data;
- analyze the extent list to retrieve the portions of data that have commonality with the previously stored data, and the portions of the set of data that are unique to the set of data from their respective locations; and
- compose the set of data by combining the portions of the set of data that have commonality with the previously stored data and the portions of the set of data that are unique to the set of data.

22. The computer program product of claim 21, the RTO comprising a desired time for processing the request to retrieve the set of data.

23. The computer program product of claim 21, the RPO comprising a restore point in time for which the request to retrieve the set of data is received.

24. The computer program product of claim 17, the desired protection type being configured to protect against at least one of the following types of failures of the backing up of the set of data: a logical failure, a subsystem failure, a system failure, or a site failure.

25. A method for deploying a system for data backup in a networked computing environment, the method comprising:
- providing a computer infrastructure being configured to:
  - receive and store in a computer data structure a set of storage configuration parameters corresponding to a set of data to be backed up in computer memory, the set of storage configuration parameters comprising at least one of the following: a recovery time objective (RTO), a recovery point objective (RPO), and a desired type of protection for the set of data;
  - compare the set of data to previously stored data to identify portions of the set of data that have commonality with the previously stored data, and portions of the set of data that are unique to the set of data;
  - make a determination as to whether the storage configuration parameters corresponding to the set of data are met by the previously stored data to which the set of data has commonality;
  - if the determination is that the storage configuration parameters are not met by the previously stored data to which the set of data has commonality, relocate the previously stored data to which the set of data has commonality to a resource where the storage configuration parameters are met;
  - determine a storage solution for storing the set of data based on the set of storage configuration parameters, the storage solution identifying at least one local storage resource and at least one remote storage resource for backing up the portions of the set of data that are unique to the set of data; and
  - store the portions of the set of data that are unique to the set of data in accordance with the storage solution.

* * * * *